UNITED STATES PATENT OFFICE.

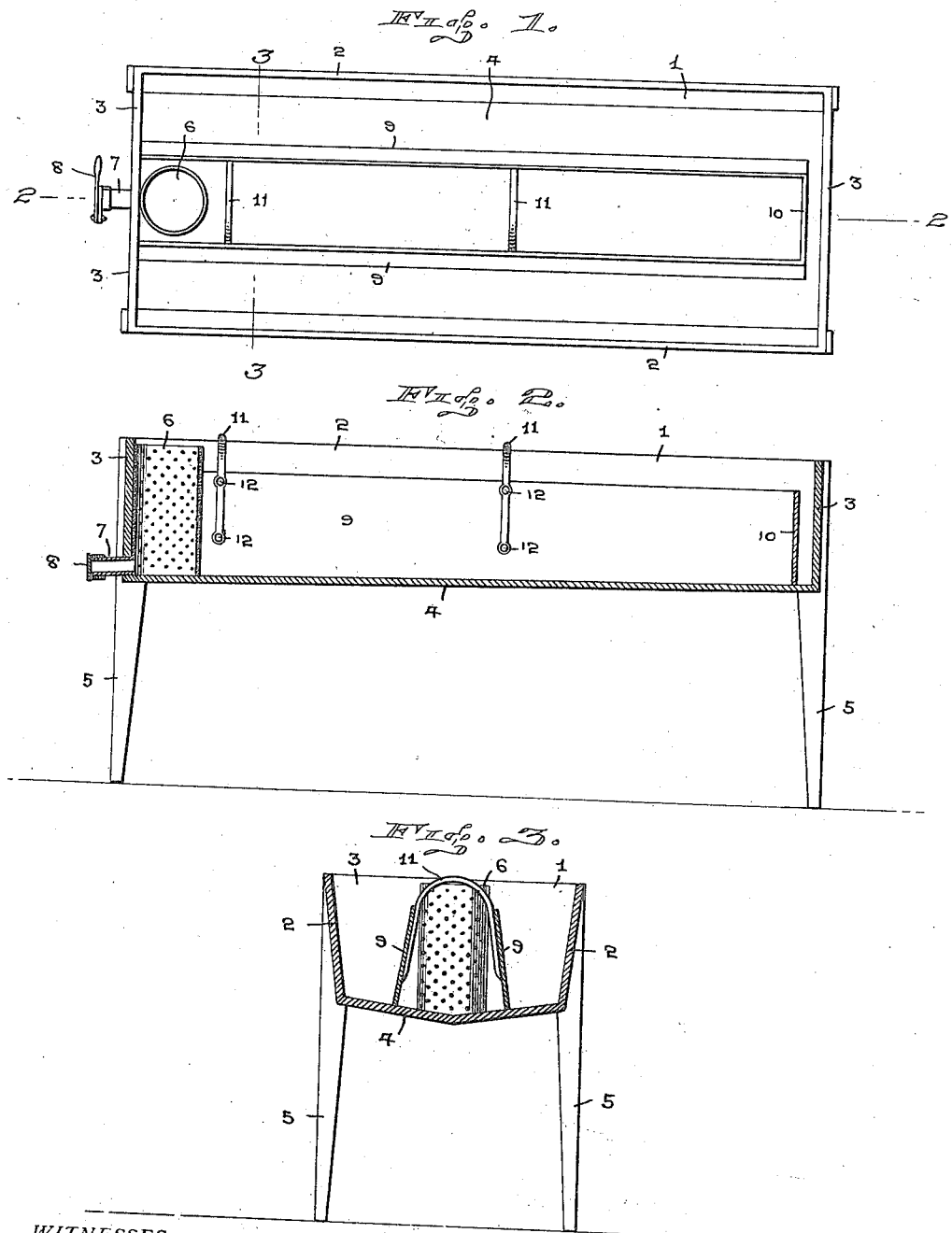

THEOBALD G. FISHER, OF OMRO, WISCONSIN.

WHEY-CHANNEL FOR CHEESE-VATS.

1,266,670.   Specification of Letters Patent.   Patented May 21, 1918.

Application filed January 22, 1918. Serial No. 213,181.

*To all whom it may concern:*

Be it known that I, THEOBALD G. FISHER, a citizen of the United States, residing at Omro, in the county of Winnebago and State of Wisconsin, have invented certain new and useful Improvements in Whey-Channels for Cheese-Vats; and I do hereby declare the following to be a full, clear, and exact description of the invention, such as will enable others skilled in the art to which it appertains to make and use the same.

This invention relates to cheese vats, and more particularly to a whey channel therefor.

The principal object of the invention is to provide and arrange a whey channel centrally and longitudinally within the cheese vat and in a position to straddle the vat strainer, so that the whey within the channel can be conveniently drained therefrom, said channel also permitting of the curd within the channel to be dipped out and deposited within the space between the sides of the channel and the sides of the vat in a position to be conveniently stirred or worked.

A further object of the invention is to provide the whey channel with downwardly diverging walls which coöperate with the downwardly converging walls of the cheese vat to form curved troughs on opposite sides of the channel.

A still further object of the invention is to provide means for bracing and maintaining the side walls of the channel in an inclined position with respect to each other.

With these and other objects in view as will appear as the description proceeds, the invention comprises the various novel features of construction, combination and arrangement of parts, as will be more fully described hereinafter and afterward specifically claimed.

Referring to the drawings,

Figure 1 represents a top plan view of a cheese vat with my whey channel positioned therein.

Fig. 2 represents a central vertical longitudinal sectional view taken on a plane indicated by the line 2—2 on Fig. 1, and Fig. 3 represents a vertical transverse sectional view taken on the plane indicated by the line 3—3 on Fig. 1.

In order that the construction and operation of the invention may be readily comprehended by those skilled in the art to which the invention relates, I have illustrated an approved embodiment thereof in the accompanying drawings and will now proceed to fully describe the same, in connection with said drawings, in which 1 is the ordinary and well known construction of cheese vat and comprises downwardly converging side walls 2, vertical end walls 3, and a bottom 4 which is inclined from its outer side edges downwardly to a point intermediate its sides so that when a cheese mixture is placed within the vat, it will drain to the center. This vat is supported at opposite ends by suitable legs 5.

A vertically disposed perforated strainer 6 is mounted centrally within the vat adjacent one end 3, and is provided at its bottom with a discharge spout 7 which extends through the end wall 3 and is provided with a controlling valve 8. These parts as just described constituting the cheese vat form no part of the present invention but are simply mentioned to give those skilled in the art to which the invention relates a clear understanding of the present invention and the manner in which it is operatively associated therewith.

The invention proper consists of a whey channel which is arranged centrally and longitudinally within the vat and comprises a pair of downwardly diverging side walls 9, each connected at one end by a vertical wall 10, the other end of the channel being left open to receive and embrace the strainer 6. As shown, the side walls 9 coöperate with the downwardly converging side walls 2 of the vat to provide a curd trough.

The side walls 9 are braced and held in spaced relation to each other by U-shaped braces 11 arranged at spaced intervals throughout the length of the whey channel. The lower ends of the braces are rigidly attached to the inner sides of the walls 9 by bolts or other suitable fastening means, as indicated at 12. These braces will also hold the walls in an inclined position with respect to each other under various working conditions or while the curd in the vat or troughs on opposite sides of the channel is being stirred or worked.

In the use of the channel and after the cheese mixture has been properly formed within the vat, the whey channel is positioned centrally and longitudinally therein so that its open end straddles the strainer 6 and bears against the end wall 3. The valve 8 is then opened to permit of the whey to drain from the channel so that the curd which happens to be therein may be readily dipped up and deposited in the trough or the space between the sides of the whey channel and those of the vat in a position to be conveniently stirred or worked. This operation if desirable may take place before the valve 8 is opened by using a perforated scoop so that the curd can be readily dipped up out of the whey in the channel.

The whey channel, by virtue of its construction, will also permit of a cheese hoop or other receptacle to be conveniently set on its top so that the curd can be dipped up and placed therein and at the same time permit of any whey that may happen to have been left therein to drain into the channel.

By the use of a whey channel of the construction as herein described, means is provided for greatly facilitating ease in separating the whey from the curd.

While I have described the principle of operation of the invention, together with the device which I now consider to be the best embodiment thereof, I desire to have it understood that such changes in construction and arrangement of parts may be made when desired as are within the scope of the appended claims.

Having thus described my invention, what I claim as new is:—

1. The combination with a cheese vat having a strainer positioned therein at one end and provided with a discharge pipe extending through the end of the vat, of a whey channel adapted to be positioned centrally and longitudinally within the vat so as to straddle said strainer.

2. A whey channel for cheese vats comprising a pair of spaced side walls, an end wall connecting said side walls at one end, and braces secured to said side walls for holding them in spaced relation to each other.

3. A whey channel for cheese vats comprising a pair of downwardly diverging side walls, an end wall connecting said side walls, and inverted U-shaped braces secured to said side walls to hold them in spaced relation to each other.

In testimony whereof I have signed my name to this specification in the presence of two subscribing witnesses.

THEOBALD G. FISHER.

Witnesses:
   JAS. B. MULVA,
   HENRY SIEFORT.

Copies of this patent may be obtained for five cents each, by addressing the "Commissioner of Patents, Washington, D. C."